United States Patent [19]

Moore et al.

[11] Patent Number: 4,915,470
[45] Date of Patent: Apr. 10, 1990

[54] OPTICAL MODULE CONNECTOR APPARATUS

[75] Inventors: Andrew Moore, Plano; Peter Morgan, Allen; Michael Wald, Rowlett, all of Tex.

[73] Assignee: Rockwell International Corporation, El Segundo, Calif.

[21] Appl. No.: 351,010

[22] Filed: May 9, 1989

[51] Int. Cl.$^4$ ............................................. G02B 6/36
[52] U.S. Cl. ................................. 350/96.20; 357/17
[58] Field of Search ............... 350/96.20, 96.21, 96.22; 357/17, 18, 19, 74, 80

[56] References Cited

U.S. PATENT DOCUMENTS 4,003,074  1/1977  Yonezu et al. .................. 357/74
4,758,719  7/1988  Sasaki et al. .................. 350/96.20

FOREIGN PATENT DOCUMENTS 2584828  1/1987  France ......................... 350/96.15

Primary Examiner—William L. Sikes
Assistant Examiner—Akm E. Ullah
Attorney, Agent, or Firm—Bruce C. Lutz; V. Lawrence Sewell; H. Fredrick Hamann

[57] ABSTRACT

An electro-optical module for facilitating connection between a fiber optic cable connector and an electrical circuit includes an interlocking tongue-and-groove design between the skirts of the module and an electro-optical active device. Within the electro-optical active device, a lens provides hermetic sealing to the case so as to eliminate the requirement for an additional window. A barrel providing partial enclosure for the lens is used to facilitate alignment with the fiber optic cable. Finally, the total module includes mechanisms so that exact spacing is obtained between the light source and the end of the fiber optic cable whereby the beam waist of the light when the device is used in the transmission mode occurs interior to the cable rather than at the surface to accommodate manufacturing tolerances, bending forces and to reduce noise generated by reflections, etc.

7 Claims, 1 Drawing Sheet

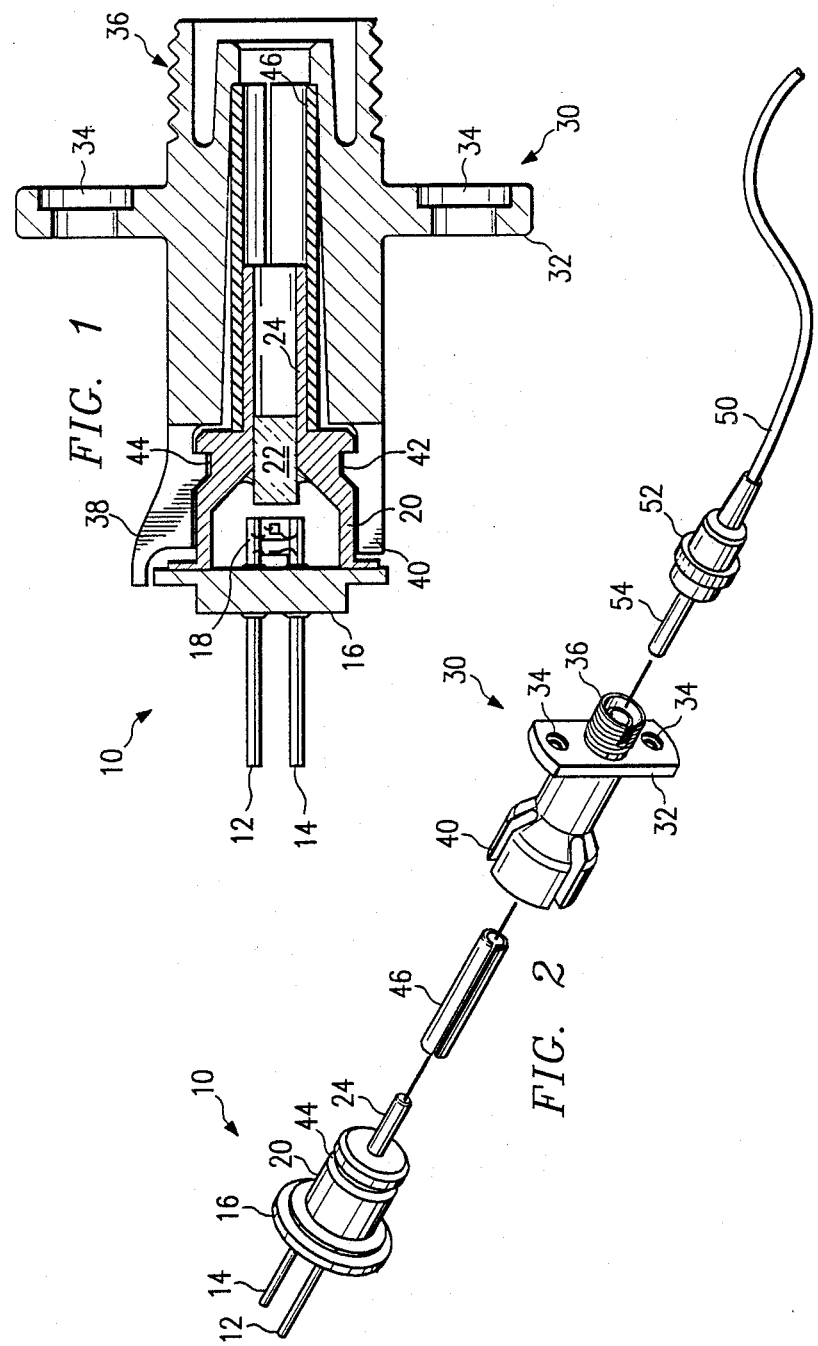

OPTICAL MODULE CONNECTOR APPARATUS

THE INVENTION

The present invention is generally concerned with electronics and more specifically concerned with connectors. Even more specifically, the invention is related to an economical connector for converting signals from electrical to optical and visa versa in connection with a single mode fiber optic cable.

BACKGROUND OF THE INVENTION

The prior art design of electro-optical connector modules included in active device which had a hermetically sealed window in a cap and some type of lens mounted with the cap so that the optical signal had to transfer between or pass through four optical interfaces. It may be noted that LED's transmit (Tx) into multimode fiber, for short distances, as lower speed signal rates do not require differing lensing schemes from the PIN (P doped Insulator, N doped) photo detector. (Rx) Further, because different optical properties and/or configurations are desirable for receiving and transmitting, the prior art devices were manufactured using different techniques, optimal elements, and spacings dependent upon whether the device was to transmit optical energy or to receive optical energy. It was further found in the prior art devices that movement of the fiber optic cable would affect the signal conversion efficiency due to misalignment of the optical signals relative the active device. Further, since prior art modules were typically assembled using epoxy or solder, a diode which may have been optimally aligned with the window, the lens, and the fiber would not remain so due to the creep that tends to occur with epoxy and solder underload over a period of time. Finally, the prior art devices have been typically designed such that an adjesive, an encapsulant, a threaded type or clamp-type connector is used to encase the active device into the connector module. LED's in multimode, short distance, low speed situations have sometimes used a "snap-in" lock-type mechanism.

The present device overcomes many of these limitations by incorporating a combination hermetic seal window as a single lens of the gradient index lens type. This same lens can be utilized in both the transmit and receive mode by changing the length of the lens within a barrel-shaped portion of the active device. As designed, the header-cap assembly can be, and is laser welded together at the time of alignment thus, assuring that there will be no misalignment creep with aging. The header-cap assembly is designed as part of a tongue-and-groove combination with skirts on the connector module so that the active device can merely be slipped into place to engage both the tongue-and-groove locking device as well as an alignment clip which coacts with a projecting fiber optic cable used to maintain alignment between the active device and the cable, to help provide precise positioning in the longitudinal axis of the two devices and to maintain conversion efficiencies even though the cable is moved due to the floating of the active device as a sub-assembly within the skirts of the module.

It is therefore an object of the present invention to provide an improved optoelectrical connection module.

Other objects and advantages of the present invention will be ascertained from a reading of the specification and appended claims in conjunction with the drawings wherein:

FIG. 1 is a cross-section of the module in connection with a corresponding active device; and FIG. 2 is an exploded view of the module in conjunction with a fiber optic cable connector to provide the complete change of signals from a fiber optic cable to electric wires.

DETAILED DESCRIPTION

In FIG. 1, an active device generally designated as 10 contains leads 12 and 14 attached to a base or header 16. Mounted on the base 16 is a post 18 having a laser diode. The post is used to obtain the proper angle for the laser diode. When this invention is used with a photodiode, the post can be eliminated. A cap 20 is attached to the header 10 by a hermetic seal type means such as laser welding. A graded index (GRIN) lens 22 is hermetically sealed to the cap 20 and provides a window to the outside. A barrel-shaped or cylindrical portion of the cap 20 is further designated as 24. A housing generally designated as 30 contains flanges 32 with fastener openings 34. It has a open central portion with a threaded end generally designated as 36 designed to receive a fiber optic cable connector and has an opposite end with slitted skirts 38 and 40. The skirt 38 is designed to accommodate a tab on the header 16 or the cap 20 to prevent rotational movement of the active device within the housing 30. Thus, the cross-sectional view of skirt 38 is not identical to skirt 40. A circular tongue 42 is illustrated within skirt 40 and its counterpart is shown within skirt 38. A groove is designed into the cap 20 and is designated as 44. The tongue-and-groove can be oppositely designed so that the groove is in the skirt and the tongue is in the cap 20. It will be noted that there is space between the cap 20 and the skirts. This gap is intentionally designed to relieve stresses occurring upon movement of the cable and its associated cable connector attached to threaded end 36. Within the housing 30, there is an alignment device in the form of a cylindrical C-clip and designated as 46. The C-clip 46 engages both the barrel-type projection 24 of cap 20 and the end of the cable as it is inserted into the housing 30 from an associated cable connector.

The same parts of FIG. 2, as found in FIG. 1, are identically numbered. In addition to those shown in FIG. 1, there is shown a fiber optic cable 50 which extends through a female-type threaded cap 52 and a protective barrel 54 for mating within the housing 30 to the end of barrel 24 of active device 10. The threaded interaction between cap 52 and the threaded extension 36 of housing 30 provides adequate contact between the end of barrel 54 and barrel 24 to assure appropriate longitudinal alignment and appropriate distance from the cable 50 to the diode portion of active device 10. While the active device 10 is shown with only two leads 12 and 14 for illustration, typical active devices may actually use several leads.

OPERATION

While the operation of the connector should be reasonably obvious in view of the detailed description, a few further comments are believed in order. The composition of the graded index lens 22 is such that its optical properties vary from unit-to-unit within a batch and is susceptible to even more variation between batches. Thus, as outlined in a co-pending patent application, Ser. No. 350,660, filed May 9, 1989, and assigned to the same assignee as the present invention, the length of the lens 22 is cut in accordance with the optical properties of that lens. The spacing of the lens 22 relative the diode or active element on post 18 of the active 10 is held to precise limits so that the beam waist is accurately positioned just interior to the end of the fiber optic cable within barrel 54 of the cable connector. This would be just beyond the end of barrel 24 of the cap 20. The sleeve 46 operates to hold the barrles 24 and 54 in alignment even though there is flexing of the cable 50. The spacing between the housing 30 and the barrel 46 along with the cap 20 provides clearance radially to reduce the potential misalignment of the focused beam.

While most of the discussion has been directed towards the conversion from electrical to optical energy (i.e., a transmitter), the same properties are desirable although not as critical in a receiver (optical to electrical energy). The present design is usable for both transmitting and receiving optical energy. The length of the GRIN lens 22 within the cap 20 and associated barrel 24 is slightly different as a function of its distance from the diode 18 but this is the only obvious alteration between mechanical aspects of the module in the transmitting and receiving forms.

Thus, the present invention accomplishes accurate focusing by maintaining a specific constant distance between the lens 22 and the diode 18 and varies the length of lens 22 to obtain proper focusing of the light to a point interior the fiber optic cable 50 within barrel 54. The device can be activated and since the surface of base 16 is flat, the cap 20 can be moved until optimal alignment between lens 22 and diode 18 is achieved and at this time, the cap 20 can be attached to base or header 16 with a laser beam. The laser weld-type attachment prevents the creep that occurs with epoxy-type or solder-type attachments. Either the laser beam used for tack-welding or a further laser beam can be used to complete the hermetic seal of the cap 20 to base 16. The tongue-and-groove combination between the skirt 40 or 38 and the associated portions of cap 20 provide a locking mechanism to maintain the active device 10 within housing 30 after insertion and still allow device movement to accommodate side forces on the cable 50. The screw-type cap 52 of the cable connector is then used to force the barrel 54 against barrel 24 of active device 10 make sure there is proper spacing between it and the diode 18 and that the beam waste of the beam (in the transmitting condition) occurs interior to the end of cable 50. The housing body 30 can be made out of an electrically insulating or non-conductive plastic housing so that the optical sub-assembly can be isolated from frame ground without requiring additional parts or assembly steps. While not shown in any specificity, rotational movement of the active device 10 can be prevented by having a tab at a given point on the active device which will coact with the skirt 38.

While we have illustrated one embodiment of the invention concept, we wish to be limited not by the specific embodiment shown, but only by the scope of the appended claims wherein we claim:

1. Laser light beam apparatus comprising, in combination:
   header including an opto-electric transducer and electrical connections;
   a cap having an outer surface and sealed to said header for environmentally protecting said transducer;
   unitary combination laser light beam convergent means for focusing and windowing comprising a sealed portion of the surface of said cap; and
   alignment barrel, comprising a part of the cap in the area of the unitary combination laser light beam convergent means for focusing and windowing, for interaction with a laser light beam transmission medium mating connection incorporating a transmission medium therein to align and maintain a predetermined range of distances relative the transmission medium of the mating connection.

2. Optical module apparatus including the light beam apparatus as claimed in claim 1 and comprising, in addition:
   a housing enclosing said laser light beam apparatus comprising the header and cap for attachment to a chassis and for mechanical connection to a fiber optic cable; and
   clip-sleeve means internal said housing and attached to said barrel for interaction with a male portion of the fiber optic cable.

3. Apparatus as claimed in claim 2 comprising in addition flexible skirt portions on said housing and interacting tongue and groove areas on flexible skirt portions of said housing and said cap to facilitate snap locking the laser light beam apparatus to said housing.

4. The process of increasing the efficiency of a laser transducing device comprising the steps of:
   incorporating a hermetically sealed combination window and convergent light focusing lens in a cap;
   positioning and juxtaposing said cap with a base including electro-optical transducer to optically align the lens with the electro-optical transducer for optimal coupling efficiency; and
   hermetically sealing the cap to said base after positioning.

5. The process of claim 4 wherein the hermetic seal is in part accomplished by:
   laser welding the cap to the base simultaneously with the positioning of the cap relative the base for optimal coupling efficiency.

6. Electro-optical module apparatus for connection to a fiber optic cable connector comprising, in combination:
   housing including a cylindrical body having flexible skirts at one end of said cylindrical body;
   active device, including base and cap wherein said cap includes a cylindrical alignment projection extending therefrom, the cap and said flexible skirts having interacting tongue and groove to facilitate snap locking the active device to said housing; and
   cylindrical slotted sleeve internal said housing and attached to said cylindrical alignment projection for interaction with a male portion of the fiber optic cable connector containing fiber optic cable.

7. Electro-optical module apparatus for maintaining connective and optical alignment to a fiber optic cable connector means comprising, in combination:
   housing including cylindrical body;
   active device, including base and cap wherein said cap means includes cylindrical alignment projection extending therefrom, incorporated within one end of said housing; and
   clip-sleeve internal said housing and attached to said cylindrical alignment projection for interaction with a male portion of the fiber optic cable connector.

* * * * *